No. 889,263. PATENTED JUNE 2, 1908.
R. P. SCOTT.
PNEUMATIC TIRE FOR VEHICLE WHEELS.
APPLICATION FILED JUNE 20, 1906.
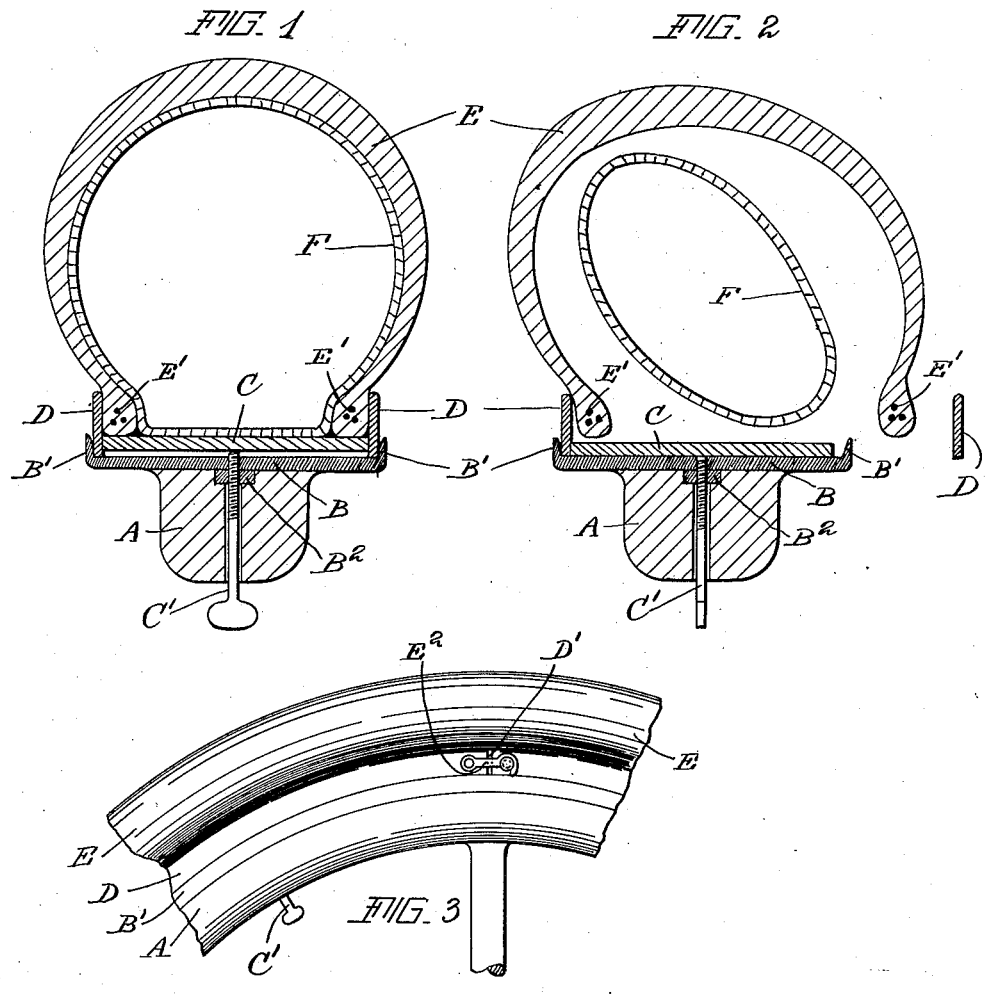
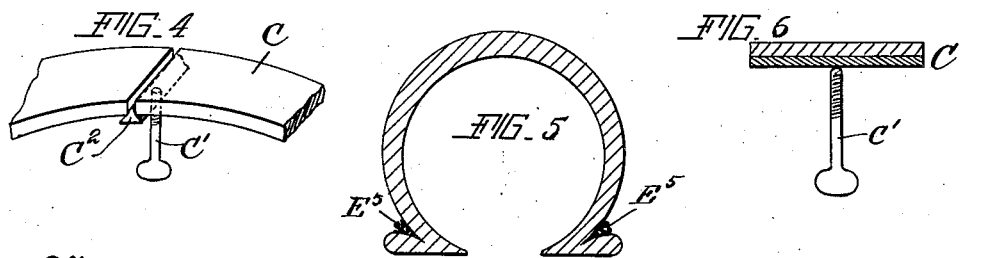
Witnesses:
Inventor:
Robert P. Scott,
By his Attorneys,

UNITED STATES PATENT OFFICE.

ROBERT P. SCOTT, OF CADIZ, OHIO.

PNEUMATIC TIRE FOR VEHICLE-WHEELS.

No. 889,263.　　　Specification of Letters Patent.　　　Patented June 2, 1908.

Application filed June 20, 1906. Serial No. 322,552.

*To all whom it may concern:*

Be it known that I, ROBERT P. SCOTT, a citizen of the United States, residing at Cadiz, Harrison county, Ohio, have invented a new and useful Improvement in Pneumatic Tires for Vehicle-Wheels, of which the following is a specification.

My invention relates to pneumatic tires for vehicle wheels, of the class in which an inextensible selvage is used in the tire shoe, that is a selvage which is either practically inextensible or else has a definite limit of stretch. With such tires for automobiles, the difficulty has been to make a proper compromise between a fit which is loose enough to enable the heavy and cumbrous shoe to be placed on the rim, and one which is tight enough to prevent undue motion of the tire on the rim after inflation and in the running operation. In prior types of pneumatic tires, with inextensible selvages, including those which have removable rim flanges, the result has been that the tire either fits so closely that it is troublesome to get it on the wheel, or else it fits so loosely as to cause undue motion, consequent chafing and wear, or else some complicated construction of the parts of the rim has been necessary. This means that the tire maker, unless he uses a complicated rim, must nicely adjust the size of his tire to the rim, which increases the expense of the manufacture, and usually requires running a lot of sizes. Even then the final result is not entirely satisfactory. I overcome these difficulties by using in combination with the tire shoe having the inextensible selvage, an annular band in the wheel rim upon which the selvage seats, which band is made expansible in a radial direction by screws or the like working in a radial direction. In this way the tire may, within limits, be made of pretty much any size you please, and as soon as it is placed upon the wheel rim, the size of the seat is automatically adjusted to the size of the tire by the expansion of the band. I use a wheel rim composed of an annulus of angle iron having flanges which are narrow as compared with those generally used in the art. The expansible band being placed in the bottom of a rim so constructed, grooves are left between each outer edge of the band and each inner edge of the wheel rim. Into these grooves I spring split annular rings, constituting removable side flanges. In this manner I secure the ready removability of the shoe residing in the removable side flange type of construction. I am enabled to utilize on a given rim tire shoes with inextensible selvages within a large compass of size, and yet secure ease of attachment and tightness of fit on the rim, thus preventing wear. Finally I have a tire and rim, the parts of which are so simple to make that a rubber manufacturer can undertake even the iron work required at a small expense for equipment.

In the drawings:—Figure 1 is a transverse section of a wheel rim and tire embodying my invention with the parts in position; Fig. 2 is a similar section with the parts detached; Fig. 3 is a side elevation of a sector of the parts of the tire shown in Fig. 1; Fig. 4 is a detail of the expansible band; Fig. 5 is a cross-section of a clencher tire converted into the inextensible selvage type of tire; and Fig. 6 is a cross-section of the expansible band made of rubber and metal.

I employ the usual wooden or metal felly A, upon which I shrink the wheel rim B composed of a central annular web, which fits against the felly, and two integral flanges B'. It will be seen that such rim B can be rolled with the utmost ease, a remark which does not apply to the wheel rim now constructed for use with removable side flanges, and this result is helped by the fact that the flanges B' may be quite narrow and yet do all the work which is put upon them. The expansible band C is a mere annular band of metal, which can readily be rolled from the flat. I may also make it compound, part metal and part rubber or leather, as shown in section in Fig. 6. It is sprung into the wheel rim B and, at the proper time, it can be expanded by means of the screws C' which pass through the felly A and are threaded into the rim B, the points of the screws taking against the inside surface of the band C. I may, if I please, use a wedge $C^2$ at the point where the two ends of the band C come together, as seen in Fig. 4, and I can act upon this wedge by one of the screws C' to assist in expanding the band without leaving an open slot between its adjacent ends. The expansible band C thus furnishes an adjustable seat for the tire. I may also braze nuts $B^2$ on the underside of the wheel rim to give a better bearing for the screw. The removable expansible side flanges D are flat annular plates of metal, having slots D'. These can readily be manufactured without requiring special skill.

The tire shoe E is provided with inextensible selvages E' and is inflated by the usual inner tube F. These selvages E' may be made inextensible by incorporating therein, in the process of manufacture, one or more metal wires, as is well understood in the art.

In case the tire should wear out on the road and it should only be possible to obtain a clencher form of tire from the nearest garage, such could readily be converted into one of the inextensible selvage type by wrapping wires $E^5$ in the crotches formed by the clencher hook, as is shown in Fig. 5. Or a ring of metal of the proper size could be readily secured in this crotch by the nearest blacksmith. It will be understood, however, that when such clencher tire is used on my rim, it loses the function of the clencher construction and develops only the functions of the inextensible selvage type of construction.

Assuming the parts in the position of Fig. 1, it will be seen that the selvage E' can readily be passed over the top of the irremovable rim flange B'. Thereupon the expansible side flange D is sprung over the flange B' and drops into the groove between the rim flange B' and the outer edge of the expansible band C. If the inner tube were inflated in this position of the parts, the selvage E' and the tire E would move relatively to the rim, as the wheel rolls on the ground, and there would be serious rubbing between the tire shoe and the removable side flanges D. But by giving a turn to the several screws C', the ring C is expanded so as to furnish not merely a firm seat for the selvages, but it may be expanded even further to take all the stretch out of the selvages and to convert these, in connection with the band C and the removable side flanges D, into what practically amounts to a single rigid structure having no motion of any kind between the parts.

To disassemble the parts of the tire, it is merely necessary to deflate the inner tube, to turn the screws C' in a direction which permits the band C to contract; and to spring the removable side flange D off the wheel rim; whereupon the selvage E' passes over the rim flange B' without trouble and the inner tube is accessible.

To insure that the removable side flanges D may not fly off the rim when the tire is deflated, I may use any efficient catch $E^2$ connecting its opposite ends, as seen in Fig. 3. I need hardly add that I may use but one expansible side flange D and construct the other side of the tire in any other suitable manner.

It will thus be seen that I have a tire all the parts of which can be readily manufactured, even at a rubber mill, by the use of simple bending tools; that the operations of attachment and detachment are simple and speedy and unaccompanied by the annoying feature of forcing a heavy selvage over a rim edge which is a trifle too large; that the seat is expanded radially by screws which move radially; that the removable side flanges are sprung into place and held there by their elasticity without the need of draw-up devices forcing them into place; and that, in operation, the parts of the rim and tire are clamped into a rigid structure with no motion between the parts, thus preventing unnecessary wear, and this by means of an exceedingly simple construction of the parts.

I claim,—

1. The combination of a pneumatic tire having an inextensible selvage, a flanged rim carrying an expansible band furnishing an adjustable seat for the selvage, and an annular, expansible and removable side flange, sprung into the space between the band and rim flange to hold the inflated tire in position, substantially as described.

2. The combination of a pneumatic tire having an inextensible selvage, a flanged rim carrying an expansible band furnishing an adjustable seat for the selvage, radially moving screws for expanding the band, and an annular, expansible and removable side flange, sprung into the space between the band and rim flange to hold the inflated tire in position, substantially as described.

3. The combination of a pneumatic tire having an inextensible selvage, a rim having an expansible band furnishing an adjustable seat for the selvage, a wedge between the ends of the band, and an annular, expansible and removable side flange sprung into the space between the band and rim flange, substantially as described.

In testimony whereof I have signed my name to this specification in the presence of two subscribing witnesses.

ROBERT P. SCOTT.

Witnesses:
  R. T. WARREN,
  H. W. LAWRANCE.